(No Model.)
E. LESTOUT, Jr.
FUMIGATOR.
No. 459,008.      Patented Sept. 8, 1891.
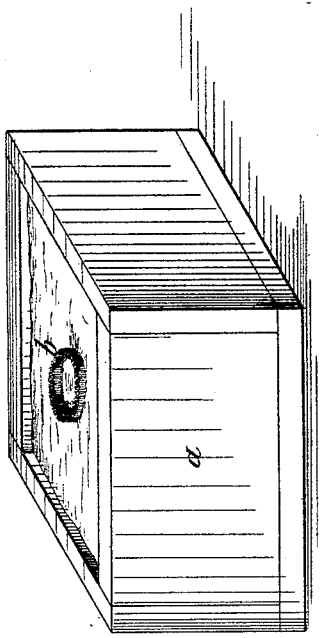
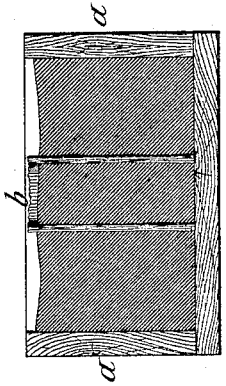
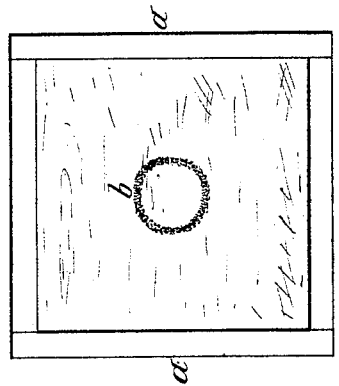

UNITED STATES PATENT OFFICE.

EDOUARD LESTOUT, JR., OF BORDEAUX, FRANCE.

FUMIGATOR.

SPECIFICATION forming part of Letters Patent No. 459,008, dated September 8, 1891.

Application filed March 17, 1891. Serial No. 385,336. (No model.) Patented in France May 17, 1887, No. 183,520.

*To all whom it may concern:*

Be it known that I, EDOUARD LESTOUT, Fils, of the city of Bordeaux, (Gironde,) France, have invented a Portable Fumigator or Smoke-Producer, (for which I have obtained Letters Patent in France for fifteen years, dated May 17, 1887, No. 183,520,) of which the following is a full, clear, and exact description.

My invention relates to a portable fumigator for the production of artificial clouds of smoke for protecting vines and crops against frost or cold and which may also be used in campaigning for masking the movements of troops or the construction of field-works.

Reference is to be had to the accompanying drawings, forming part of this specification, in which—

Figure 1 represents a sectional elevation, Fig. 2 a plan and Fig. 3 a perspective view, of the fumigator.

$a$ is a box or case made of wood or other suitable material, preferably of rectangular form, which may be provided with a lid, and also with rope or other handles, to render it more easily portable. This box or case is filled with an inflammable composition consisting of a mixture of, say, equal parts of resinous matters and earthy matters—such as clay, terra-alba, and the like—reduced to impalpable powder, the mixture being in the form of a solidified compact mass. At the center of the composition is a tubular wick $b$, of straw or other material, which extends down through the entire depth of the mass and serves to kindle the composition. This wick may, however, be dispensed with and the composition be ignited by pouring on it a few drops of an inflammable liquid, such as alcohol, petroleum, or schist oil, &c.

These fumigators may be made of any size and weight of combustible materials.

I claim—

1. A portable fumigator or smoke-producer consisting of a case containing a smoke-producing composition consisting of resin and clay in about the proportions stated, substantially as shown and described.

2. A fumigator or smoke-producer consisting of a case containing the herein-described smoke-producing composition, consisting of resin and clay in about the proportions stated, with means, substantially as described, for igniting the said composition, as and for the purposes set forth.

EDOUARD LESTOUT, FILS.

Witnesses:
   PIERRE EXBEN,
   JEAN DUSSEL,
   HORACE G. KNOWLES.